United States Patent [19]
Sato et al.

[11] Patent Number: 5,658,213
[45] Date of Patent: Aug. 19, 1997

[54] POWER TRAIN CONTROL APPARATUS AND METHOD FOR A VEHICLE

[75] Inventors: Kazuhiko Sato, Hitachioota; Masahiko Ibamoto, Hitachinaka; Hiroshi Kuroiwa, Hitachi, all of Japan

[73] Assignees: Hitachi, Ltd.; Hitachi Automotive Engineering Co., Ltd., both of Japan

[21] Appl. No.: 506,631

[22] Filed: Jul. 25, 1995

[30] Foreign Application Priority Data

Jul. 25, 1994 [JP] Japan ................... 6-172312

[51] Int. Cl.⁶ ............... F16H 59/14; F16H 59/68
[52] U.S. Cl. ......................... 475/125; 475/904
[58] Field of Search ....................... 475/125, 904

[56] References Cited

PUBLICATIONS

Electronically–Controlled Automatic Transmission with "Hold" Mode Function; Keiji Bouda, Mikio Kawahara, Takuji Fujiwara and Hiroaki Yokota; vol. 42, No. 8, 1988, pp. 1017–1022.

Primary Examiner—Charles A. Marmor
Assistant Examiner—Nathan O. Jensen
Attorney, Agent, or Firm—Evenson, McKeown Edwards & Lenahan, P.L.L.C.

[57] ABSTRACT

In a power train control apparatus including an engine, an automatic transmission having a torque converter, and a control unit for controlling the engine and the automatic transmission, the control apparatus is provided with a microcomputer for calculating and estimating values of the input shaft torque and a gear ratio of the automatic transmission. Various characteristics of the engine and the torque converter are obtained in advance by experiments, such as the relationship between an engine torque and an engine speed, and that between a pump capacity coefficient data and a slip ratio of the torque converter. Thereafter, data tables are made by using these characteristics, and control factors required to control the engine and the automatic transmission are made as an equation in relation to the input shaft torque and the gear ratio so as that they can be calculated by the microcomputer.

1 Claim, 6 Drawing Sheets

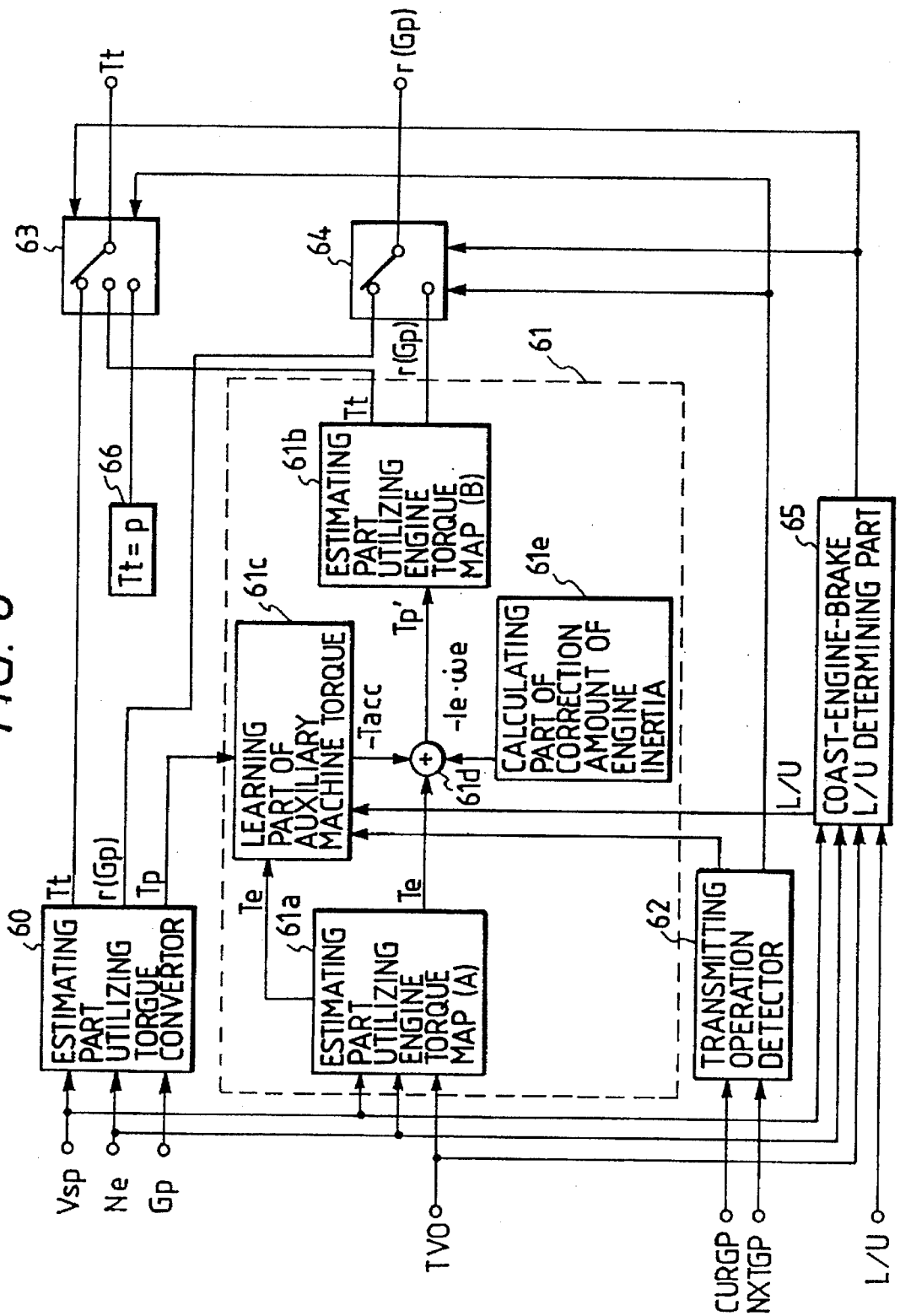

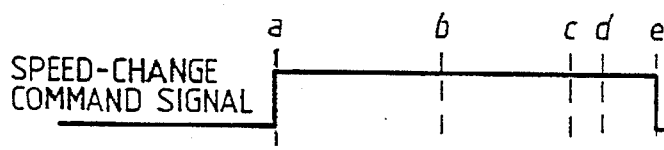
FIG. 7
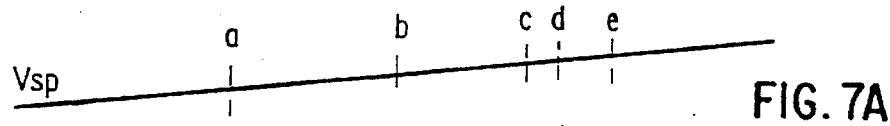
FIG. 7A
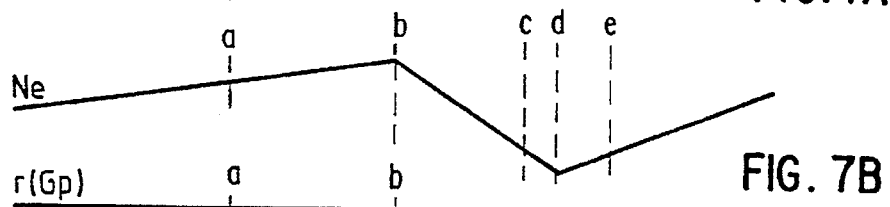
FIG. 7B
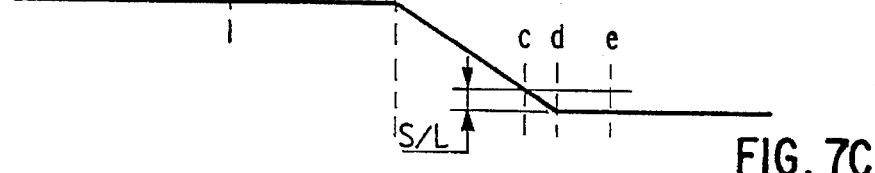
FIG. 7C
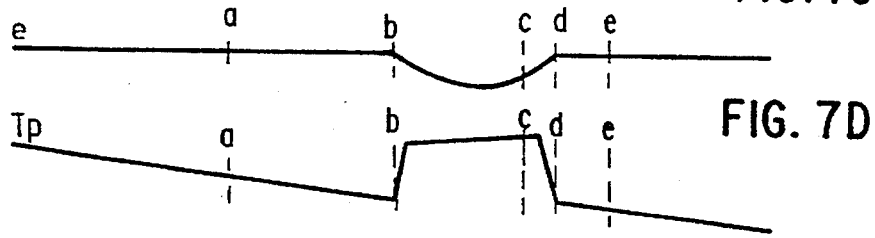
FIG. 7D
FIG. 7E
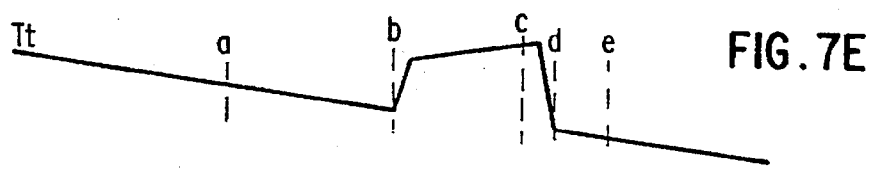
FIG. 7F
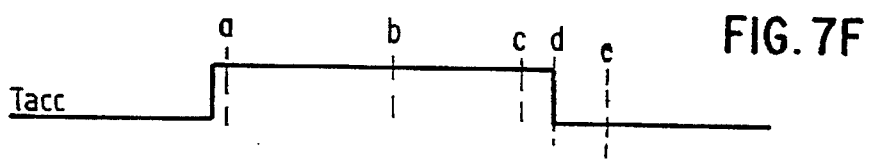
FIG. 7G
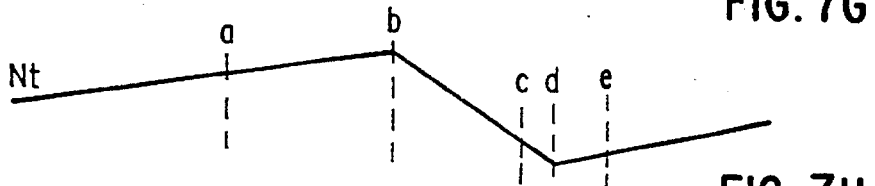
FIG. 7H
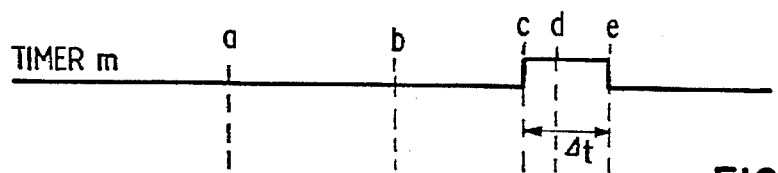
FIG. 7I

POWER TRAIN CONTROL APPARATUS AND METHOD FOR A VEHICLE

BACKGROUND AND SUMMARY OF THE INVENTION

The present invention relates to a power train control apparatus and method for a vehicle provided with a power train having a power train mechanism for converting a driving power of an engine by an automatic transmission and transmitting it to a drive shaft.

In a vehicle which includes the system for converting a driving power of an engine by an automatic transmission and transmitting it to a drive shaft, a conventional control apparatus for controlling such a system by using a rotation speed of an input shaft of the automatic transmission is disclosed as "an Electronically-Controlled Automatic Transmission with "Hold" Mode Function in "an Automobile Technique, Vol.42, No.8, p1017, 1988". The control of an engine or automatic transmission is performed by providing a disk with an outer circumferential groove on the input shaft of the automatic transmission, detecting a cyclic period of rotation of the groove by using an electromagnetic pick-up, measuring the rotation speed of the input shaft, then calculating an input torque by using it, and obtaining a drive shaft torque. The detecting means is called as a turbine sensor. Further, there is another method in which a torque sensor for detecting the input shaft torque is used. Because the turbine sensor or the torque sensor is used to detect the rotation speed or the torque of the input shaft, the weight of the apparatus and its cost is increased.

An object of the invention is to provide an improved power train control apparatus and method, in which the rotation speed or the torque of the input shaft can be calculated and estimated accurately from input data such as an opening of a throttle valve and the engine rotation speed without using the turbine sensor and the torque sensor.

In order to attain the above object, the present invention is provided in a power train control apparatus comprising an engine, an automatic transmission having a torque converter, and a control unit for controlling the engine and the automatic transmission. The control apparatus is provided with calculating and estimating apparatus for calculating and estimating values of the input shaft torque and a gear ratio of the automatic transmission. Various characteristics of the engine and the torque converter are obtained in advance by experiments, such as the relationship between an engine torque and an engine speed, and that between a pump capacity coefficient data and a slip ratio of the torque converter. After that, data tables are made by using these characteristics, and control factors required to control the engine and the automatic transmission are calculated by a microcomputer in relation to the input shaft torque and the gear ratio.

By the construction described above, the rotation speed of the input shaft and the input shaft torque of the automatic transmission can be calculated and estimated in a simple manner by using the input data such as the throttle valve opening and the engine speed without decreasing accuracy.

The above and other advantages of the invention will become more apparent in the following description and the accompanying drawings in which like numerals refer to like parts.

BRIEF DESCRIPTION OF THE DRAWINGS

FIG. 6 is a block diagram showing all the controls.

FIG. 7 is a timing chart illustrating the effects of the present invention.

DESCRIPTION OF THE DRAWINGS

Figure 1:
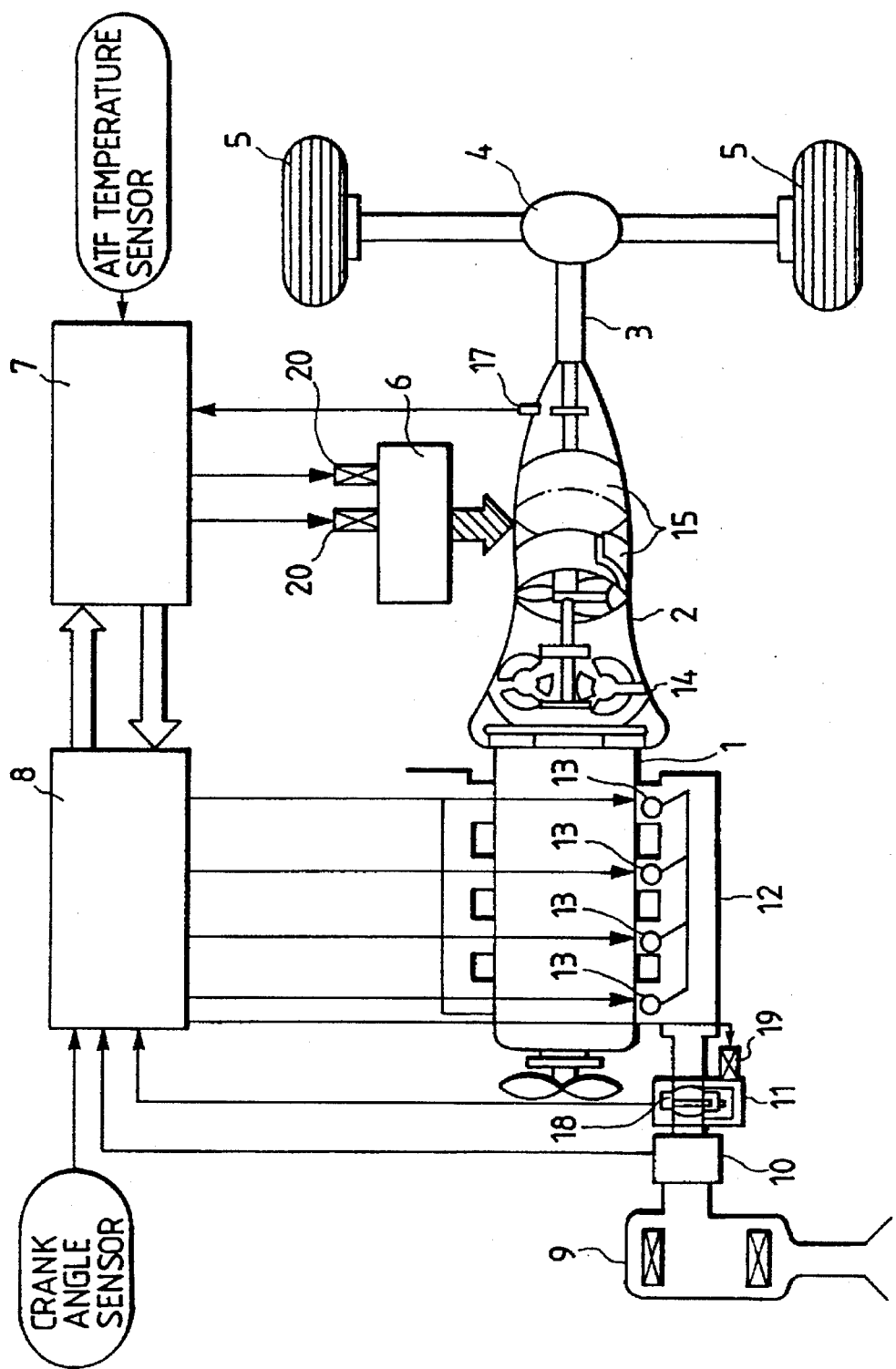
FIG. 1 is a schematic diagram showing the construction of the system according to the present invention.

In FIG. 1, numeral 1 designates an engine numeral 2 an automatic transmission numeral 3 a drive shaft connected to the output shaft of the automatic transmission 2, numeral 4 a differential unit, numeral 5 a drive wheel, numeral 6 an oil pressure unit, numeral 7 a control unit of the automatic transmission (hereinafter, referred to as an ATCU), numeral 8 a control unit of the engine 1 (hereinafter, referred to as an ECU), numeral 9 an air cleaner for eliminating a foreign substance, numeral 10 an air flow sensor for detecting the amount of engine intake air, numeral 11 a throttle controller for adjusting the amount of intake air by controlling the throttle valve opening, numeral 12 intake manifold, and numeral 13 an injector for supplying fuel to the engine 1. The throttle controller 11 is provided with a throttle sensor 18 for detecting the opening of the throttle valve, and an idle speed control valve 19 for controlling the idle speed of the engine 1 by adjusting the correction amount of the intake air (hereinafter, referred to as an ISC valve). There is provided a crank angle sensor 21 for detecting an engine speed on the crank shaft (not shown) of the engine 1. Further, an exhaust gas sensor 25 for detecting the burning condition of the engine 1 is provided in an exhaust pipe 24 of the engine 1. The automatic transmission 2 is provided with a torque converter 14 and a gear train 15, and a sensor 17 for detecting the rotation of the transmission output shaft is provided on the transmission output shaft connected to the drive shaft 3. Further, an ATF temperature sensor 22 for detecting the oil temperature of the automatic transmission 2 is provided in an oil sump (not shown) of the automatic transmission 2. Furthermore, a switching electro magnetic valve 20 is provided in the oil pressure unit 6, which controls the combination of gears of the gear train 15 of the automatic transmission 2 and the beginning point or the terminating point of shift. The ECU 8 receives signals from the air flow sensor 10, the throttle sensor 18, the crank angle sensor 21, the exhaust gas sensor 25, etc., calculating the engine speed, etc., and calculating the fuel amount on the basis of their calculated values. Then, the ECU 8 outputs a valve-open signal to the respective injector 13 and controls the fuel amount to be injected. The ECU 8 also calculates the ignition timing and outputs an ignition signal to a ignition plug 22. When the engine is in an idling state, the ECU 8 outputs a valve-open signal to the ISC valve 19 and controls the correction air amount during idling the ATCU 7 meanwhile carries out various calculations on the basis of the output signals from the rotation detecting sensor 17, the ATF temperature sensor 22, etc., and data which includes the engine speed, the throttle valve opening, etc. from the ECU 8, and outputs the valve-open signal to the switching electro magnetic valve 20 of the oil pressure unit 6.

Figure 2:
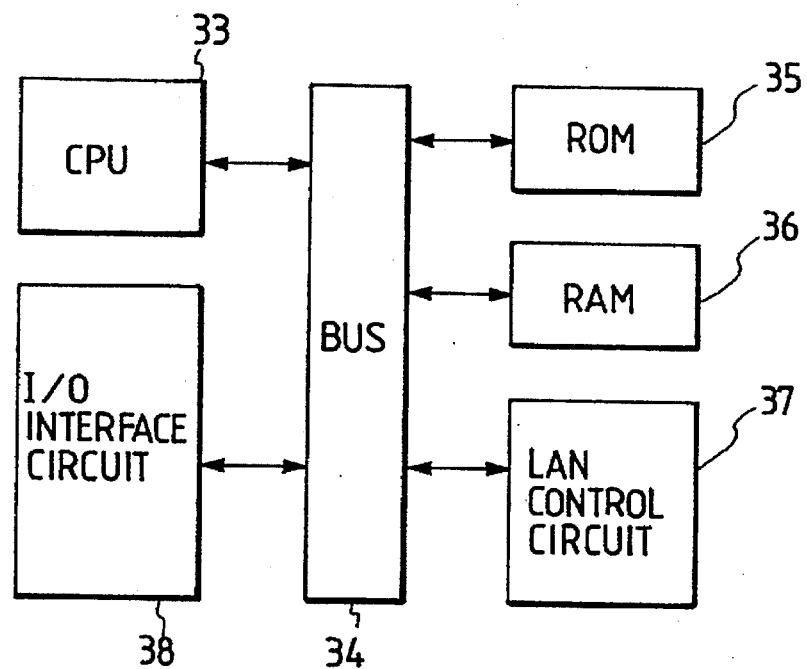
FIG. 2 is a block diagram showing the main construction of the control unit of an engine.

FIG. 2 is a block diagram showing the main construction features of the ATCU 7 and the ECU 8 which includes a central processing unit (CPU) 33, a read only memory (ROM) 35, a random access memory (RAM) 36, and an input/output interface circuit 38 so as to sandwich a bus 34 between them. If the intercommunication is performed between the ATCU 7 and the ECU 8, it is required to provide further a LAN control circuit 37.

Figure 3:
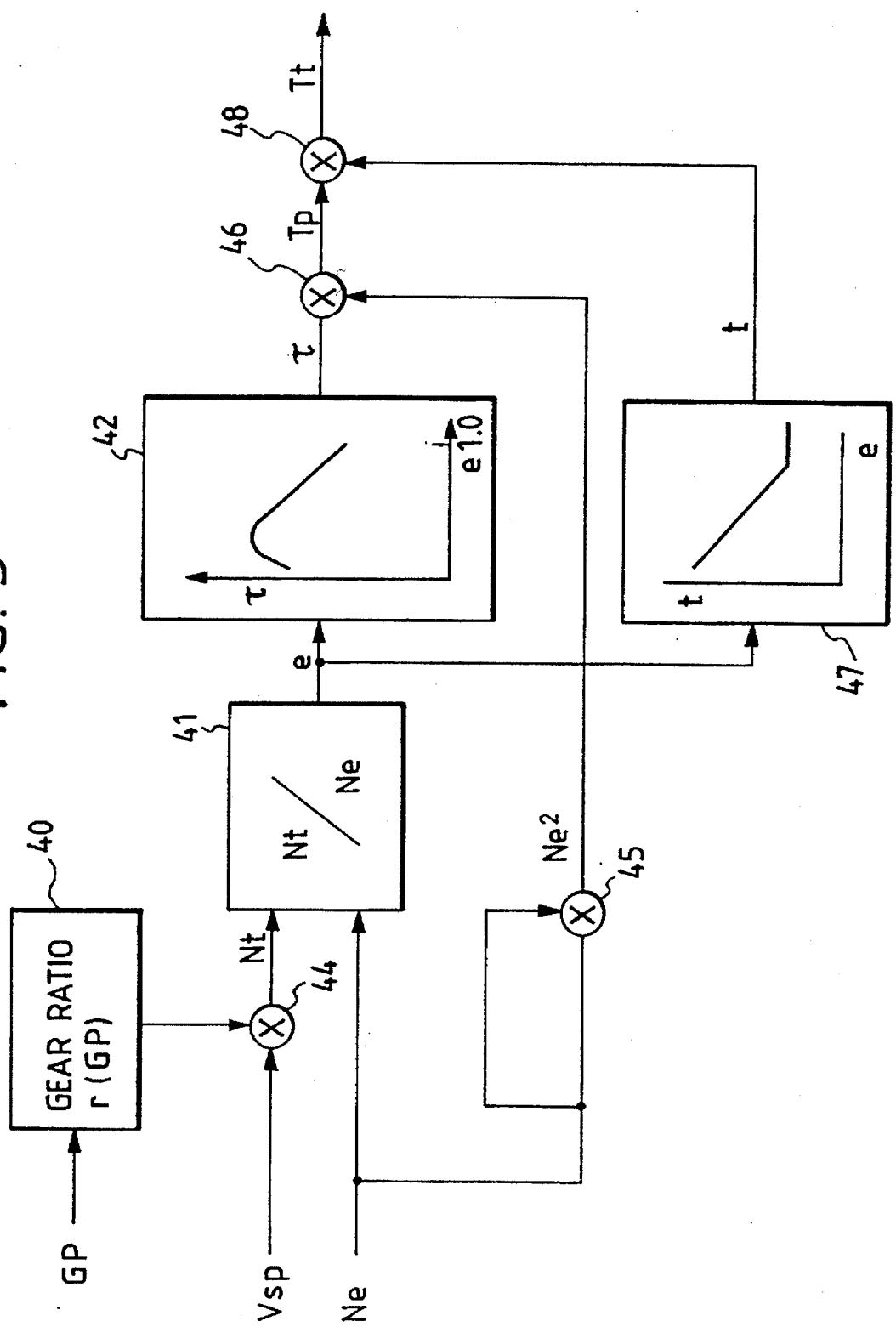
FIG. 3 is a control block diagram illustrating a calculating and estimating step for a turbine torque Tt during non-shift.

FIG. 3 is a control block diagram illustrating a calculating and estimating step for obtaining a turbine torque Tt or input shaft torque of the gear train 15 of the automatic transmission 2 from the gear ratio r (Gp) corresponding to the gear position Gp during non-shift. In block 40, the gear ration r (Gp) is obtained from the gear position Gp. The output shaft speed Vsp of the automatic transmission 2 is inputted from the rotation detecting sensor 17. Because the gear train 15 is completely connected at predetermined gear ratio during non-shift, the turbine speed Nt or the input shaft speed of the automatic transmission 2 can be calculated precisely by multiplying the Vsp by the gear ratio r (Gp) in block 44.

$$Nt = r \cdot Vsp \tag{1}$$

Then, the slip ratio e of the torque converter 14 can be calculated by dividing the turbine speed Nt by the engine speed Ne in block 41.

$$e = Nt/Ne \tag{2}$$

In block 42, the pump capacity coefficient $\tau$ is obtained from the relationship (hereinafter, referred to as an e-$\tau$ characteristics) between the pump capacity coefficient $\tau$ and the slip ratio e of the torque converter 14 stored in advance in a ROM 35 shown in FIG. 2. Next, the square of the engine speed Ne is calculated in block 45 and an input torque Tp of the torque converter 14 is calculated on the basis of the following equation (3) by using the pump capacity coefficient $\tau$ and the square of the engine speed.

$$Tp = \tau \cdot Ne^2 \tag{3}$$

In block 47, the torque ratio t is obtained from the relationship (hereinafter, referred to as e-t characteristics) between the torque ratio t and the slip ratio e of the torque converter 14 stored in advance. Next, the turbine torque Tt is calculated on the basis of the equation (4) in block 48.

$$Tt = t \cdot Tp \tag{4}$$

As explained above, it is possible to calculate and estimate highly precisely the turbine torque Tt from the gear ratio r (Gp) during non-shift. The drive shaft torque of the drive shaft 4 can be obtained by multiplying the turbine torque Tt by the gear ratio r (Gp) and the final deceleration ratio.

Figure 4:
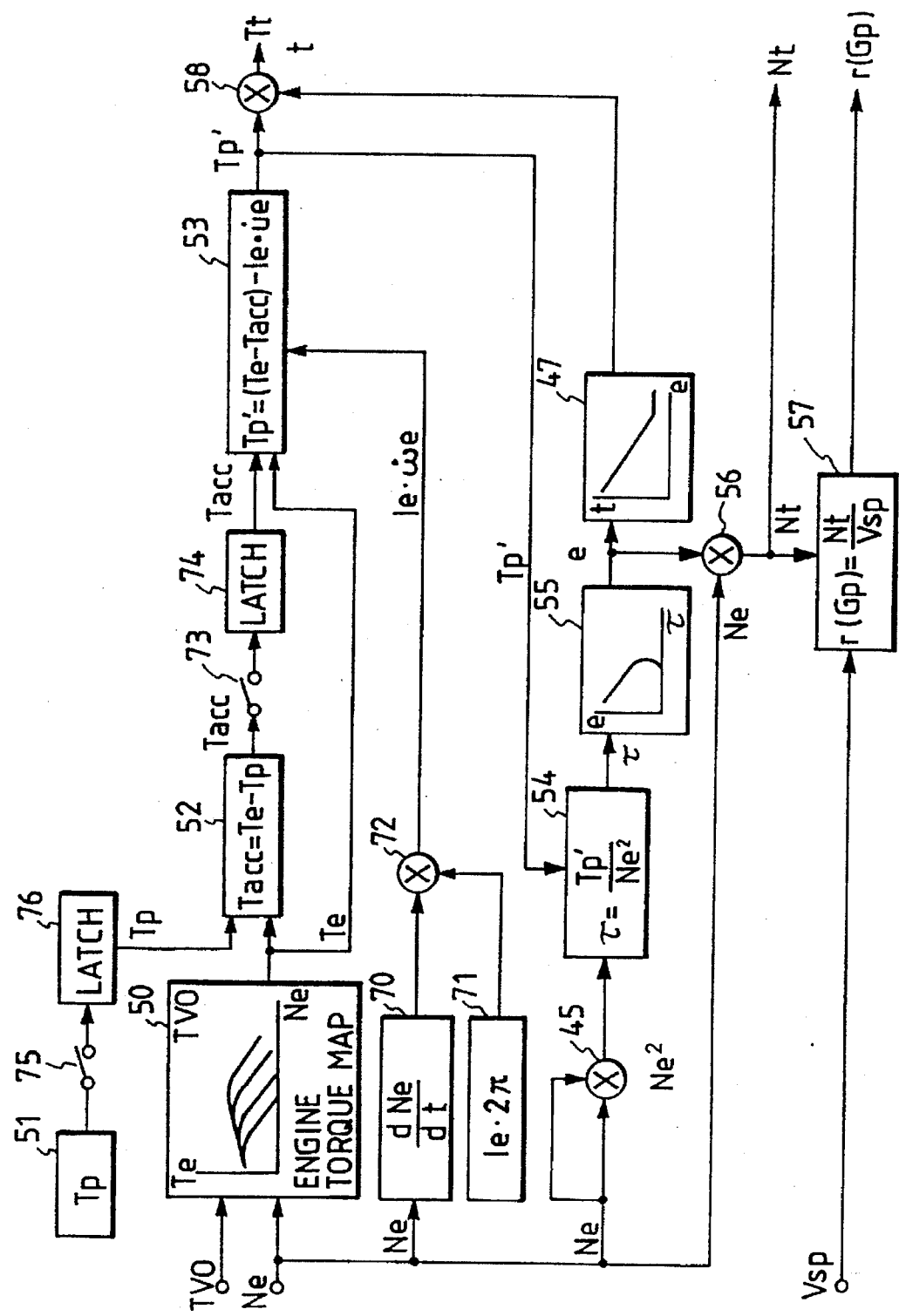
FIG. 4 is a control block diagram illustrating a calculating and estimating step for a turbine torque Tt during shift.

FIG. 4 is a control block diagram illustrating a calculating and estimating step for a turbine torque Tt during shift, namely, in a transition condition from the gear position having been connected so far to the next gear position. In block 50, the engine torque Te is obtained by using a table of characteristics of the engine torque stored in advance in the ROM 35 shown in FIG. 2. FIG. 4 illustrates an example in which the engine torque Te is obtained from the input information the engine speed Ne and the throttle valve opening TVO detected by the throttle sensor 18. However, it will be appreciated that the engine torque will be obtained in a similar way by using the relationship between engine intake air amount Qa and the engine speed Ne, or that between the injector pulse width Ti and the engine speed Ne. The value of the input torque Tp of the torque converter 14 during non-shift just before shift obtained in FIG. 3 is stored in block 51. This value of the input torque Tp is always written in the latch of block 76 through a switch 75. When a shift command signal (not shown) is outputted, the switch 75 is opened and the value of the input torque Tp is stored in block 76. Next, the deviation between the input torque Tp and the engine torque Te obtained in block 50 is calculated in block 52.

$$Tacc = Te - Tp \tag{5}$$

This deviation corresponds to the auxiliary machinery torque Tacc loaded on the engine. The auxiliary machinery torque Tacc is written temporarily in the latch of block 74 through a switch 73 which will be opened when the shift command signal is outputted. During shift, the temporarily stored value of the torque Tacc is utilized in the calculation. The engine torque Te obtained in block 50 is always inputted in block 53. In order to improve the precision during the transition state by considering the inertia of the engine, the differential value dNe/dt of the engine speed Ne is calculated in block 70, it is multiplyed by an inertia moment Ie of the engine and 2$\pi$, and the Ie·d$\omega$e/dt is obtained by using both results in block 72. In FIG. 4, $\omega$e means d$\omega$e/dt. In block 53, the difference between the engine torque Te obtained in block 50 and the auxiliary torque Tacc is obtained. Then, the difference between the previously obtained difference and the inertia correction amount of the engine is obtained, and the resultant difference is set to as an input torque Tp' of the torque converter during shift at that time. This will be shown in the following equation.

$$Tp' = (Te - Tacc) - Ie \cdot d\omega e/dt \tag{6}$$

where, d$\omega$e/dt designates the gradient of change of the engine speed Ne. If the up-shift is performed as in the present invention, the engine speed Ne goes down due to the shift and thus the d$\omega$e/dr becomes a negative number. As a result, the Tp' can be obtained by adding the absolute value of Ie·d$\omega$e/dt to (Te−Tacc). In the down-shift, the change in the engine speed Ne goes up and thus the d$\omega$e/dt becomes a positive number. As a result, the Tp' can be obtained by subtracting the absolute value of Ie·d$\omega$e/dt from (Te−Tacc). The inertia moment Ie of the engine is suitably selected from a plurality of inertia moments corresponding to the shift stage of the transmission in consideration of the inertia moment of the transmission such as the torque converter and the gear train. Thereby, it is possible to estimate and calculate at a high accuracy. In block 54, the pump capacity coefficient $\tau$ is calculated in reverse by substituting the input torque Tp' and the square of the engine speed Ne obtained in block 45 for the equation (3). Then, the slip ratio e is obtained from the inverse e-r characteristics stored in advance and shown in block 55. In block 56, the turbine speed Nt is obtained by the inverse calculation of the equation (2), that is, by multiplying e by Ne. In block 57, the gear ratio r (Gp) is obtained from the following equation (7).

$$r(Gp) = Nt/Vsp \tag{7}$$

Meanwhile, the torque ratio t is obtained by using the e-t characteristics in block 47. Then, the turbine torque Tt during shift is calculated by substituting the torque ratio t and the input torque Tp' obtained in block 53 for the following equation (8).

$$Tt = t \cdot Tp' \tag{8}$$

where, because two e's exist for one τ in the inverse e-t characteristics, it is impossible to obtain the slip ratio e as it is.

Figure 5:
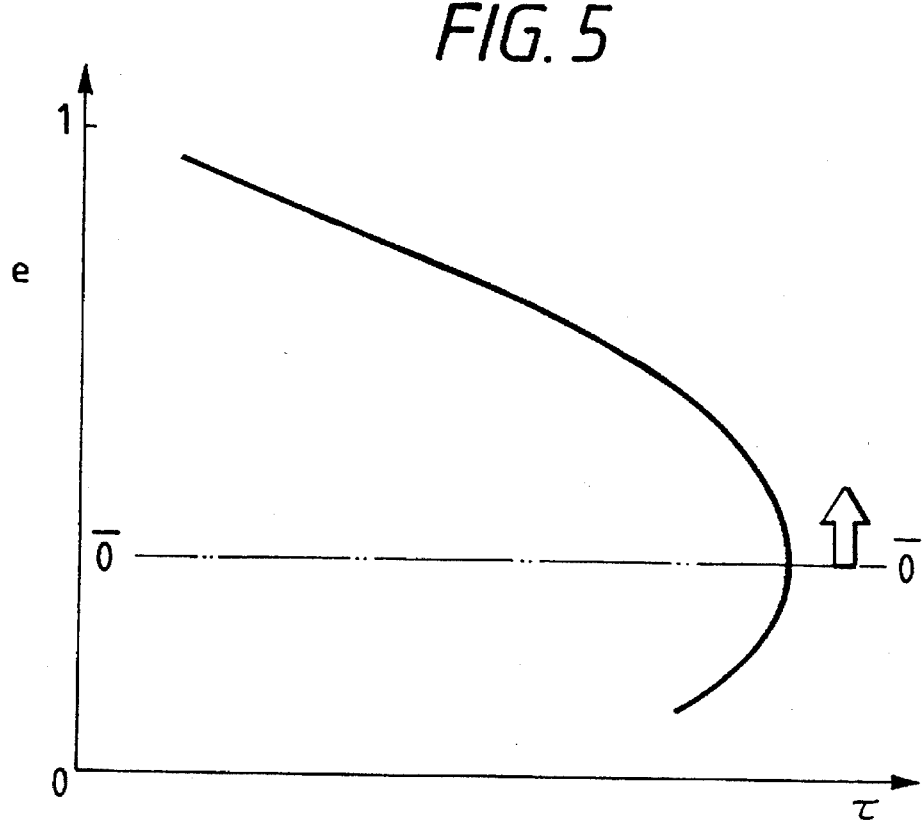
FIG. 5 is a characteristic diagram illustrating the relationship between a pump capacity coefficient $\tau$ and a slip ratio e of the torque converter.

FIG. 5 is a characteristic diagram illustrating the relationship between a pump capacity coefficient τ and a slip ratio e of the torque converter, in which the limited region of the slip ratio e is shown, that is available to the above calculation. Normally, the region where the slip ratio e is small exists only when a vehicle is started, and such region where the slip ratio e is small does not exist during shift. Therefore, the inverse e-τ characteristics part designated by an arrow may be utilized, which is above the bending point of the slip ratio e. As described hereinbefore, the turbine torque Tt and the gear ratio r (Gp) during shift can be obtained.

FIG. 6 is a control block diagram showing the overall controls. Block 60 designates an estimating part utilizing the torque converter characteristic, including the calculating and estimating block during non-shift explained in detail in FIG. 3. Block 61 surrounded by a dotted line designates an estimating part utilizing the engine torque characteristic, including the calculating and estimating block during shift explained in detail in FIG. 4. The determination of whether or not during shift is performed by a during-shift detecting part in block 62. The determination is carried out by using the current gear position signal CURGP and the next gear position signal NXTGP to be shifted next. If both signals are the same in block 62, it is determined that the shift has already completed. Otherwise, it is determined that during shift is occurring. How to produce the CURGP and NXTGP signals will be explained later in FIG. 7. If it is determined at first that during shift in block 62 is occurring, the signal indicative of the start of shift is supplied to block 61c. In block 61c, the auxiliary machinery torque Tacc is stored by substituting the engine torque Te just after the start of shift obtained in block 61a and the newest input torque Tp of the torque converter during non-shift obtained in block 60 for the equation (5). This value of Tacc is maintained until a shift start command is supplied from block 62 and it is utilized in the calculation of the input torque Tp' of the torque converter during shift which will be carried out in block 61d. In block 61e, the inertia corrections of the engine, etc. are calculated by using the differentiated values of the engine speed and the inertia moment of the engine, etc. Upon the results, the input torque Tp' of the torque converter is obtained according to the equation (6) in block 61d. In block 61b, the gear ratio r (Gp) and the turbine torque Tt are calculated on the basis of the input torque Tp' as explained in FIG. 4. Block 63 designates apparatus for switching the turbine torques obtained in blocks 60 and 61. The switching operation of both switch apparatus is performed by using the during-shift signal from block 62 and the signal from a coast-engine-brake L/U determining part 65. Where, the L/U means a lock-up, a mechanically connecting state due to the oil pressure of the turbine impeller and pump impeller of the torque converter 14. The coast-engine-brake means a state under the operation of the engine brake. When it is in the coast-engine-brake, the throttle valve opening is fully closed and the engine torque Te is small. Therefore, it can adopt almost constant characteristics and the accuracy is not greatly affected. As a result, in block 66, a constant value can be used as the value of the turbine torque Tt. The switching logic in blocks 63 and 64 is as follows.

(a) when not in an L/U state and in a non-shift state . . . use block 60.

(b) when in an L/U state and in a non-shift state . . . use block 61.

(c) when in an L/U state, in a non-shift state and in a coast-engine-brake state . . . use block 61.

(d) when not in an L/U state, in a non-shift state and in a coast-engine-brake state . . . use block 60, where P is constant.

(e) when not in an L/U state and in a shift state . . . use block 66. (other combinations do not exist)

The switching logic will be explained further. When in the L/U state, it is impossible to carry out the estimation due to the characteristics of the torque converter as shown in FIG. 6. Therefore, an auxiliary machinery torque learning part of block 61c is operated by the L/U signal from block 65, and the auxiliary machinery torque Tacc is calculated on the basis of the equation (5) and stored. The value of the auxiliary machinery torque Tacc is maintained until the L/U signal stop command is outputted from block 65. This is utilized in the calculations of the input torque Tp' of the torque converter in block 61d and the turbine torque Tt and gear ratio r (Gp) in block 61b. That is, it is obtained by using block 61 while the L/U signal is being outputted. When it is in the coast-engine-brake state, the pump impeller is driven, along with the rotation drive from the side of wheels of the turbine impeller of the torque converter, and thus the engine is also rotated. Because the torque converter is inversely rotated compared with a normal condition, it is therefore impossible to use the above e-t characteristics and e-τ characteristics as they are. In such a case, the e-t characteristics and e-τ characteristics are obtained in advance by experiments and stored, the calculation and estimation is performed by utilizing the pre-stored characteristics.

FIG. 7 is a timing chart illustrating the control of the present invention, in which the up-shift operation is performed. The shift diagram (shift schedule) is depicted and stored by using the output shaft speed Vsp and the engine speed Ne, or the output shaft speed Vsp and the throttle valve opening TVO. If the actual operation line crosses over any one of shift lines in the shift diagram, the shift command is outputted (for example, a point in FIG. 7). While the shift command is being outputted, it is determined that in a during-shift state, and the calculating and estimating logic during shift is carried out. In the region before a point, the gear ratio r (Gp), the turbine speed Nt, the slip ratio e, the input torque Tp of the torque converter, and the turbine torque Tt are calculated by the procedure shown in FIG. 3. In the region after a point, the gear ratio r (Gp), the turbine torque Tt, etc. are calculated by the procedure shown in FIG. 4. Firstly, the auxiliary machinery torque Tacc is calculated by substituting the engine torque obtained at a point and the input torque Tp of the torque converter obtained just before a point for the equation (5). The torque Tacc is stored and maintained during a to e periods of time or during shift. The input torque Tp' of the torque converter during shift is obtained by substituting Tacc for the equation (6) every predetermined cyclic periods of calculation. At the same time, the slip ratio e and the turbine speed Nt are also calculated. When it reaches b point, the state of the connection of the gears starts to change and the engine speed transfers from the going-up characteristic to the Going-down characteristic. Due to the change in the engine speed Ne, the gear ratio r (Gp), the turbine speed Nt, the slip ratio e, the input torque Tp', and the turbine torque Tt change remarkably between b and d points as shown in FIG. 7. When it reaches d point, the connection of the gears is completed.

Therefore, the engine speed Ne goes up again. In the present embodiment, the shift command signal is terminated in the following way. When the magnitude of the calculated gear ratio r (Gp) becomes lower than the predetermined slice level S/L, a timer tm is run just for Δt period of time and set so as to stop at e time point. The timer stop point is set to as a stop point of the shift command signal. However, the present invention is not limited within the scope of the above method. It should be appreciated that it is possible to start and stop the timer for an arbitrary period of time from the a time point. Now, when it is reached e time point, the control step is returned to the logic during non-shift and the calculation and estimation is carried out according to the procedure shown in FIG. 3. The drive shaft torque can be obtained by multiplying the turbine torque Tt obtained so far by the gear ratio r (Gp) and the final deceleration ratio.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A power train control apparatus, comprising an engine, an automatic transmission having a torque converter, and a control unit for controlling the engine and the automatic transmission, and means for calculating and estimating values of an input shaft torque and a gear ratio of the automatic transmission.

* * * * *